US008579433B2

(12) United States Patent
Margolis

(10) Patent No.: US 8,579,433 B2
(45) Date of Patent: Nov. 12, 2013

(54) LOW-COST EYEGLASSES

(76) Inventor: Mark S. Margolis, Reseda, CA (US)

(*) Notice: Subject to any disclaimer, the term of this patent is extended or adjusted under 35 U.S.C. 154(b) by 132 days.

(21) Appl. No.: 12/969,354

(22) Filed: Dec. 15, 2010

(65) Prior Publication Data

US 2011/0205483 A1   Aug. 25, 2011

Related U.S. Application Data

(60) Provisional application No. 61/306,868, filed on Feb. 22, 2010.

(51) Int. Cl.
*G02C 1/00* (2006.01)
*G02C 5/00* (2006.01)

(52) U.S. Cl.
CPC . *G02C 1/10* (2013.01); *G02C 5/008* (2013.01)
USPC .............. 351/86; 351/154; 351/178

(58) Field of Classification Search
CPC ............. G02C 1/06; G02C 1/10; G02C 5/008
USPC ................ 351/41, 154, 83–89, 178, 159.75, 351/159.76; 2/441–444
See application file for complete search history.

(56) References Cited

U.S. PATENT DOCUMENTS

| | | | | |
|---|---|---|---|---|
| 2,449,564 A * | 9/1948 | Moulsdale et al. | | 2/442 |
| 3,958,867 A * | 5/1976 | Morgan | | 351/47 |
| 4,834,525 A * | 5/1989 | Vansaghi | | 351/158 |
| 6,340,226 B1 | 1/2002 | Akaba et al. | | |
| 7,625,081 B2 * | 12/2009 | Margolis | | 351/41 |
| 2005/0231827 A1* | 10/2005 | Sakaki | | 359/796 |
| 2009/0097117 A1* | 4/2009 | Coleman | | 359/497 |

FOREIGN PATENT DOCUMENTS

GB    1092829 A    11/1967

OTHER PUBLICATIONS

International Search Report and Written Opinion for the International Application No. PCT/US2011/025761, issued by International Searching Authority, dated May 9, 2011.

* cited by examiner

*Primary Examiner* — Huy K Mai
(74) *Attorney, Agent, or Firm* — Arent Fox LLP

(57) ABSTRACT

Low cost spectacles may include a paper or plastic frame and injection molded plastic lens or lenses, where the lens may be easily removed and changed within the frame. In one example, the lens may have a round shape, and securing the lens within the frame may be accomplished by inserting the lens into the aperture in the frame, and rotating the lens, for example, by ¼ of a turn. The lens may have a flange extending radially outward from an edge of the lens, wrapping substantially around a circumference of the lens. The lens may further have a key extending radially outward from an edge of the lens. The key is configured to fit the lens into the aperture of the frame. When the lens is rotated within the aperture, a portion of the frame enters a channel between the key and the flange to secure the lens to the frame.

13 Claims, 3 Drawing Sheets

LOW-COST EYEGLASSES

CROSS-REFERENCE TO RELATED APPLICATIONS

This application claims priority to and the benefit provisional patent application No. 61/306,868, filed in the United States Patent and Trademark Office on Feb. 22, 2010, the entire content of which is incorporated herein by reference.

BACKGROUND OF THE INVENTION

1. Field

The instant specification relates generally to spectacles, and more particularly, to low-cost eyeglasses with interchangeable lenses.

2. Background

Traditionally, reading eyeglass frames have been commonly made from relatively expensive and durable materials such as metal or plastic. Reading lenses, originally made from glass, are now made from various types of plastic, including polycarbonate—reducing the danger of breakage and weighing less than glass lenses. Some currently used plastics also have more advantageous optical properties than glass, such as better transmission of visible light and greater absorption of ultraviolet light. Conventional plastic or glass reading lenses, however, are relatively expensive, typically including features such as an anti-scratch coating, an anti-reflective coating, polarization, photosensitive or photochromic materials, etc.

In certain situations it may be desired to provide an inexpensive alternative to the structural materials previously mentioned, for example, by providing paper framed glasses with inexpensive lenses. Thus, there is a need in the art for the latter mentioned glasses, which, although inexpensive, may magnify viewing material as effectively as a conventional pair of glasses.

SUMMARY

In various representative aspects, the instant disclosure provides for low cost spectacles having paper or plastic frames and interchangeable injection molded plastic lenses. Exemplary features may include a capability to provide printed advertising material on the frames, selection and modification of properties of the lenses, and the provision of lenses having a long focal length suitable for reading glasses.

In one aspect, the disclosure provides spectacles having a frame with at least one aperture and at least one removable lens for altering a user's vision when viewing through each of said at least one aperture. Here, the lens includes a key and the at least one aperture is configured to fit the key, such that the key secures the lens to the frame when the lens is rotated within the aperture.

Another aspect of the disclosure provides spectacles having a paper frame with at least one aperture, and at least one injection molded plastic lens for altering a user's vision when viewing through each of said at least one injection molded plastic lens.

Yet another aspect of the disclosure provides a method for securing an injection molded plastic lens within a frame. The method includes inserting the lens into an aperture of the frame, where the aperture has a shape substantially corresponding to a shape of at least a portion of the lens. The method further includes rotating the lens within the aperture to engage a portion of the frame within a channel between a key and a flange extending radially outward from an edge of the lens.

These and other aspects are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

Figure 1:
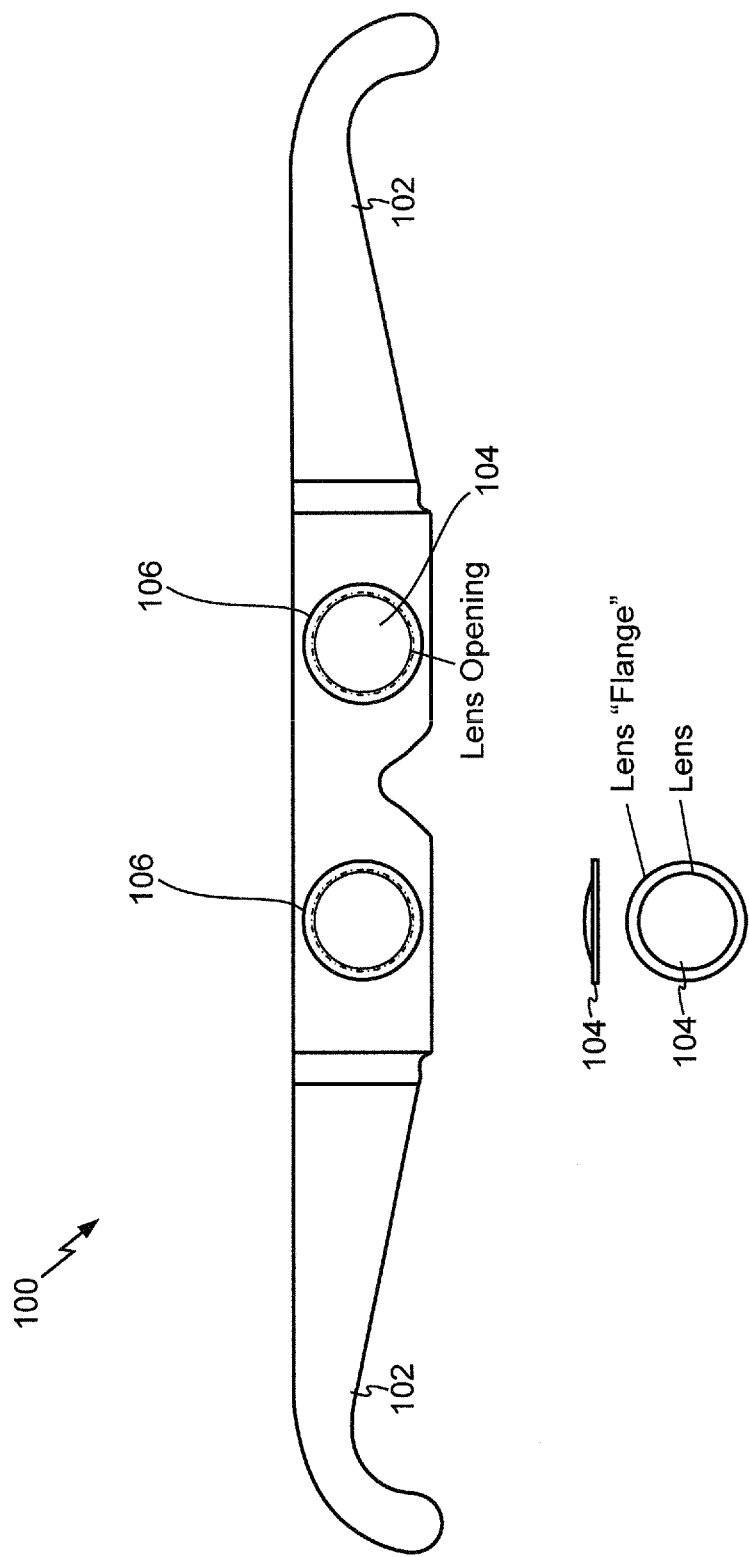
FIG. 1 is an illustration of a pair of eyeglasses according to an exemplary embodiment.

Elements and steps in the figures are illustrated for simplicity and clarity and have not necessarily been rendered according to any particular sequence. For example, steps that may be performed concurrently or in different order are illustrated in the figures to help to improve the understanding of various aspects of the disclosure.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Also, in the context of the present application, when an element is referred to as being "connected" or "coupled" to another element, it can be directly connected or coupled to the other element or be indirectly connected or coupled to the other element with one or more intervening elements interposed therebetween. Like reference numerals designate like elements throughout the specification.

FIG. 1 illustrates a perspective view of spectacles 100 with lenses 104 in accordance with an exemplary aspect of the disclosure. Although spectacles are described herein in their traditional sense, the terms spectacles, eyeglass, and eyeglasses may be used interchangeably to refer to binocular and/or monocular spectacles having a frame with or without temple arms or ear pieces 102. For example, one of ordinary skill in the art may appreciate that the configuration disclosed may apply equally to: (1) reading eyeglasses with two lenses, one for each eye for binocular vision; (2) a reading magnifier that may be used over one eye, i.e., a monocle for monocular vision; or (3) a single magnifying lens mounted in a frame large enough for two eyes. Moreover, the instant disclosure may apply to a lens to be mounted to a camera or other viewing instrument, for example, having a frame configured as a bayonet mount or bayonet connector to fasten a lens in front of a camera lens.

The spectacles 100 illustrated in FIG. 1 may have a pair of ear pieces 102 and a pair of apertures 106. The apertures 106 may be any opening, i.e., any shape or size, which would allow a user to see, observe, inspect, examine, or otherwise perceive an object through the opening. The pair of ear pieces 102 may facilitate a user's ability to affix the spectacles 100 temporarily to one's face. Alternatively, the spectacles 100 may forgo the presence of any ear pieces 102 and may simply be held in the user's hand. Once in the user's hand, the spectacles 100 may be manually placed over one's eyes for viewing objects through the apertures 106. The use of the spectacles 100 without ear pieces 102 may be referred to as a hand held or a lorgnette.

In an exemplary embodiment, the frame of the spectacles 100 may be constructed of an inexpensive material such as paper or plastic. For example, a paper frame may be constructed of a paper board material, including one sheet or a plurality of sheets laminated together, in some embodiments, die-cut from paper stock. Of course, the term "paper" may be construed to include a broad range of apparatus having any suitable thickness, rigidity, etc., manufactured from any suitable type of a broad range of materials (e.g., plant matter, cellulose, animal skins, synthetic materials, etc.), chosen according to a manufacturer's needs. In another example, the frame of the spectacles 100 may be die cut or molded from an inexpensive plastic material, e.g., similar to a credit card. In these examples, the frame of the spectacles 100 may be printed with advertisements, notices, or other commercial indicia that may indicate manufacturing or distribution information.

The lens 104 may alter light passing through the lens 104 to improve or correct vision, to ease reading, or to magnify miscellaneous objects according to the index of refraction of the material and the difference in the curvature between the two surfaces of the lens 104. In typical spectacles, the lenses are mounted in the frames to position the lenses in front of a user's eyes. According to various exemplary aspects of the instant disclosure, the lenses may be colored or substantially clear. Various lenses may be utilized for magnification, reading, ophthalmic vision correction, 3D applications, solar viewing, etc. Further, because lenses according to an aspect of this disclosure are interchangeable, different lenses may be swapped in and out for different applications, resulting in a modular lens eyeglass system.

The lens 104 may be unifocal, with one correction for all distances, or it may correct for more than one distance (multifocal); in one aspect of the disclosure, the lens 104 may be configured as half-glasses (eyeglasses that have half lenses and are used for reading only). The lens 104 may be made of plastic, polycarbonate, acrylic, glass, or any other suitable material. In an exemplary embodiment, the lens is a molded acrylic, polycarbonate, or other polymer. In general, the greater the index of refraction, the thinner the lens 104 can be. In an exemplary embodiment, the lens 104 may be a sheet magnifier that comprises many very narrow concentric ring-shaped lenses, such that the combination acts as a single lens but is much thinner than conventional convex lenses. This arrangement is known as a Fresnel lens.

In some embodiments the lens 104 may be an injection molded plastic material. One aspect of such a material and construction is that, particularly in comparison to a Fresnel lens, a long focal length may be obtained. In one example, the lens may be adapted to provide a focal length of about 18 inches; however, a focal length of greater than about six inches may be suitable depending on various aspects and characteristics of a particular design. In another aspect, the lens may have a diopter of about +1.5, or more broadly, in a range between 1 and 5 to provide standard reading glasses. However in accordance with the disclosure the diopter may be as low as 0.5 depending on various aspects and characteristics of a particular design.

Figure 2:
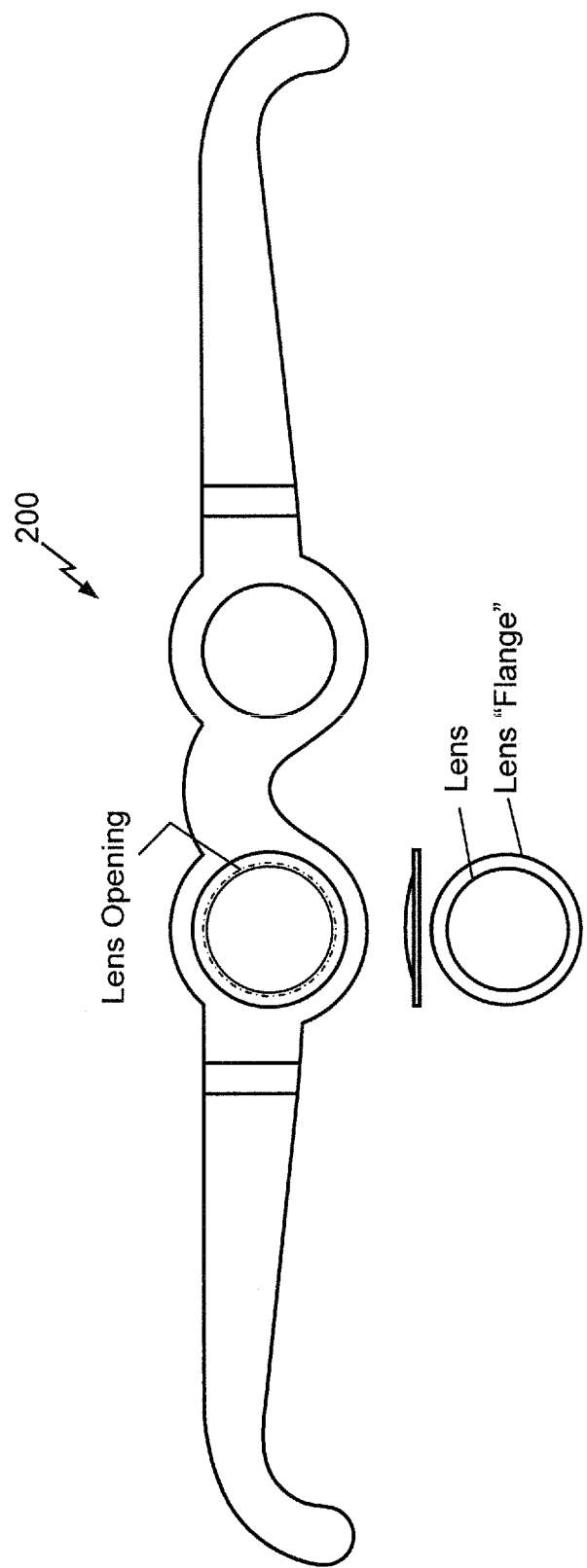
FIG. 2 is an illustration of a pair of eyeglasses according to another exemplary embodiment.

FIG. 2 is an illustration of a frame 200 having a different shape. Those skilled in the art will comprehend that the frame 200 may take any suitable form or shape according to various design parameters.

Figure 3:
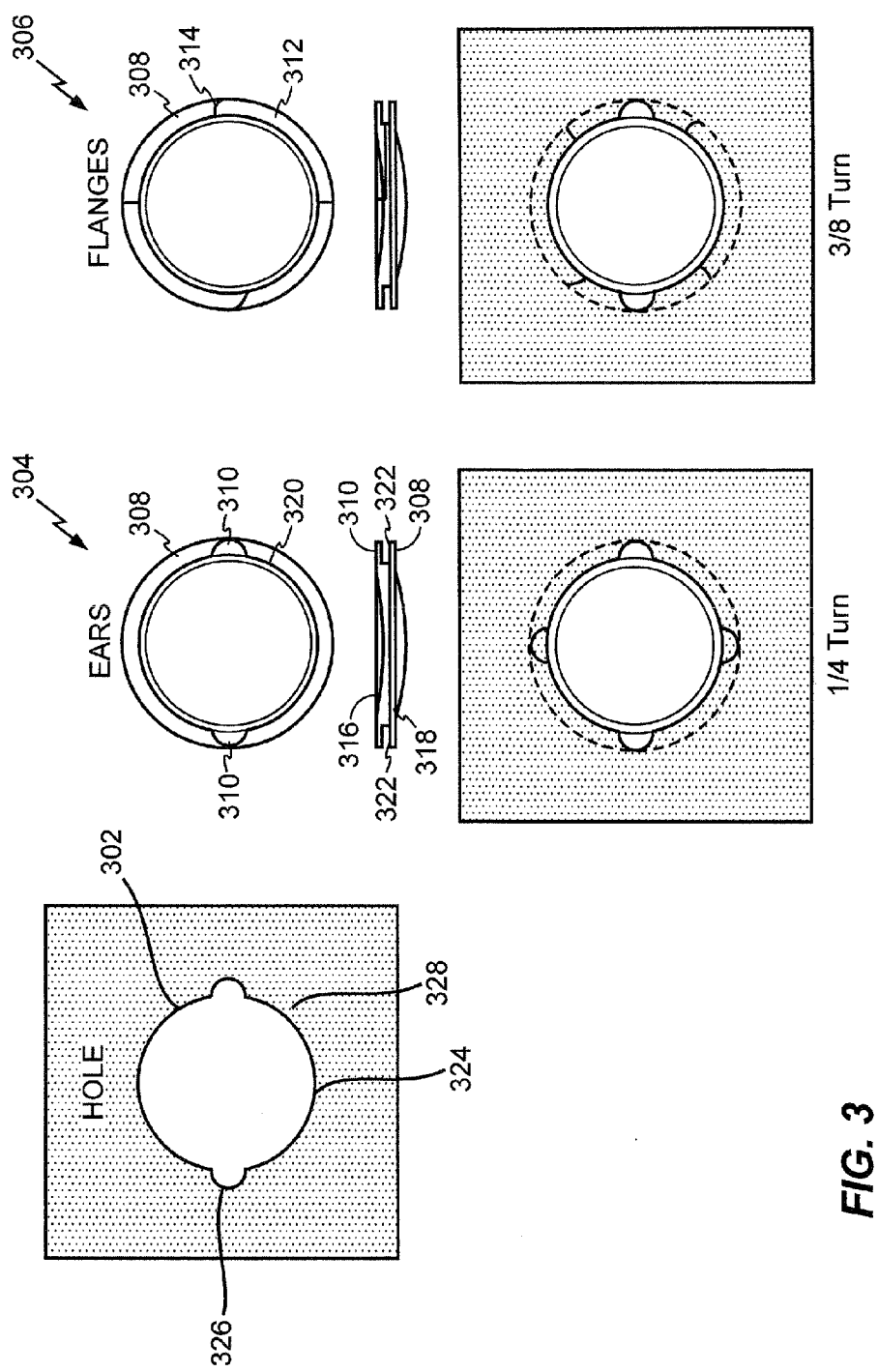
FIG. 3 is an illustration showing an aperture in a frame, and lenses according to two exemplary embodiments.

FIG. 3 is a schematic illustration showing details of the lens and aperture into which the lens is inserted, to show how the lens may be inserted into and secured in the frame in accordance with various aspects of the disclosure. Here, the frame of the spectacles is illustrated as having a square shape, but of course, the frame may take any suitable shape such as illustrated in FIGS. 1, 2, or essentially any other shape. In an exemplary embodiment, the lens 304 or 306 may be substantially round in outline to facilitate rotation of the lens in an aperture 302. According to various configurations, the lens may include a flange 308 and a key 310 or 312.

In one example illustrated as lens 304, the lens 304 may be removably placed into the aperture 302 in the frame by substantially aligning the key 310 with the shape of the aperture 302 and inserting the lens 304 into the aperture 302, such that the flange 308 engages the surface 328 of the frame and prevents the lens 304 from passing completely through the aperture 302. The lens may be rotated such that a portion of the frame is engaged within a channel 322 between the flange 308 and the key 310 to secure the lens 304 to the frame by friction.

Here, the terms "top" and "bottom" are only used with reference to the orientation of the illustration, for ease and clarity of description. The flange 308 may extend radially outward from a bottom surface 318 of the lens 304, wrapping substantially around the circumference of the lens 304. Of course, the flange 308 need not necessarily wrap entirely around the circumference of the lens, but other configurations extending around a portion of the lens may be used in accordance with aspects of the disclosure. The flange 308 may have a thickness that is less than the thickness of the cylindrical lens 304. For example, in an embodiment where the bottom surface of the flange 308 is flush with the bottom surface of the lens 308, if the thickness of the lens is $T_{lens}$, and the thickness of the frame is $T_{frame}$ (where the frame may be secured in the channel 322 between the flange 308 and the key 310), then the thickness of the flange $T_{flange}$ may be substantially equal to $(T_{lens}-T_{frame})/2$. However, this thickness may be modified to any suitable thickness enabling the lens to be secured to the frame, e.g., within the channel 322.

Here, the key may have any of various suitable shapes or sizes, for example, having a semi-circular profile, or rounded corners, for easy insertion into the keyhole. As illustrated on the lens 304, the key 310 has a semi-circular shape extending radially outward from the edge of the lens 304. Here, the key 310 has a top surface substantially flush with the top surface 316 of the lens 304, and the key 310 has a thickness substantially equal to $(T_{lens}-T_{frame})/2$. However, as is the case with the flange 308 described above, various embodiments may place the top surface of the key 310 in a position other than being flush with the top surface 316 of the lens 304, and the thickness of the key 310 may vary from the thickness described herein, without departing from the spirit and scope of the instant disclosure.

With the key 310 and flange 308 configured according to the above description, a channel 322 is created between the key 310 and the flange 308. Thus, to place the lens 304 into the aperture 302, the lens 304 is placed such that the keys 310 substantially align with the shape of the aperture 302. For example, the aperture 302 may include a substantially circular opening 324 and one or more notches 326. The notches 326 may have a shape substantially the same as the shape of the keys 310, or a shape substantially different from the shape of the keys 310, as long as the keys 310 are capable of being inserted into the notches as described below. Here, the notches 326 align with the keys 310, such that the keys 310 pass through the notches 326 when the lens 304 is aligned and inserted into the aperture 302. Thereafter, the flange 308 engages a surface of the frame, preventing the lens 304 from passing entirely through the aperture 302. When the flange is engaged with the surface of the frame, the lens may be rotated, for example, by one quarter of a turn. Here, a portion of the frame proximate to the aperture 302 is engaged within the channel 322 between the flange 308 and the key 310, securing the lens 304 in the aperture 302. In an exemplary embodiment, the channel 322 is configured to fit snugly around the frame to reduce or prevent unwanted rotation of the lens during use.

In order to remove the lens 304 from the frame, the lens 304 may be rotated by one quarter of a turn, that is, until the keys 310 are substantially aligned with the notches 326, and the portion of the frame proximate to the aperture 302 is no longer within the channel 322. Thus, the lens 304 may be easily replaced with another lens, for example, having different optical properties, such as different magnification, a different color, a different application, etc. Thus, a system of interchangeable lenses in the same or different frames is provided.

The shape of the key may be configured to suit various design choices, such as, but not limited to how secure the lens is in the aperture, and how easy it is to rotate the lens to secure it to the frame. In the embodiment already described, the key is a substantially semi-circular shape, protruding radially from an edge 320 of the lens 304 outward to a distance substantially the same as the distance that the flange 308 extends. In another embodiment, illustrated as lens 306, the key 312 may wrap approximately one quarter of the way around the circumference of the lens 306, extending radially from the edge of the lens 306 the same distance as the flange 308 extends from the edge of the lens 306. Of course, those skilled in the art will comprehend that the circumferential distance around the lens that the key extends is a matter of design preference, and may be modified within the spirit and scope of this disclosure. Here, the lens 306 may utilize an aperture 302 substantially the same as the aperture described above, wherein the key 312 includes a curved edge 314 facilitating the insertion of the key 312 into the semicircular notch 326 as the lens 306 is rotated within the aperture 302. In one embodiment, insertion of the curved edge 314 into the notch 326 may be facilitated by pressing down (e.g., squeezing) or lifting up the frame on one side of the notch 326. In this embodiment, the lens 306 may be secured best by rotating the lens 306 by ⅜ of a turn after aligning the curved edge 314 of the key 312 with the notch 326 in the aperture 302. The lens 306 may be removed from the frame by continuing its rotation in the same direction, such that the key 312 emerges from the notch 326.

In the foregoing specification, spectacles have been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. Spectacles comprising:
   a frame having at least one aperture; and
   at least one removable lens for altering a user's vision when viewing through each of said at least one aperture,
   wherein the lens comprises a key, and the at least one aperture of the frame is configured to fit the key, such that the key secures the lens to the frame when the lens is rotated within the aperture.

2. The spectacles of claim 1, wherein the key comprises at least one tab extending radially outward from an edge of the lens, and wherein the lens further comprises a flange extending radially outward from the edge of the lens and running circumferentially around the lens by a circumferential distance greater than a circumferential distance that the key runs around the lens, such that a channel is between the tab and the flange.

3. The spectacles of claim 2, wherein, when the lens is rotated within the aperture, a portion of the frame enters the channel between the tab and the flange to secure the lens to the frame.

4. The spectacles of claim 2, wherein the key has a semicircular shape.

5. The spectacles of claim 1, wherein the aperture comprises at least one tab corresponding to the key such that the key is configured to enter the aperture through the tab.

6. The spectacles of claim 1, wherein the frame comprises paper.

7. The spectacles of claim 1, wherein the at least one removable lens comprises at least one injection molded plastic reading glass lens.

8. The spectacles of claim 1, wherein the at least one lens is adapted to provide a focal length of greater than six inches.

9. The spectacles of claim 8, wherein the focal length is about 18 inches.

10. Spectacles comprising:
    a paper frame having at least one aperture securing an injection molded plastic lens, the injection molded plastic lens adapted to provide a focal length of greater than six inches, wherein the lens comprises a key, and the at least one aperture of the paper frame is configured to fit the key, such that the key secures the lens to the paper frame when the lens is rotated within the aperture.

11. The spectacles of claim 10, wherein the key comprises at least one tab extending radially outward from an edge of the lens, and wherein the lens further comprises a flange extending radially outward from the edge of the lens and running circumferentially around the lens by a circumferential distance greater than a circumferential distance that the key runs around the lens, such that a channel is between the tab and the flange.

12. The spectacles of claim 11, wherein, when the lens is rotated within the aperture, a portion of the paper frame enters the channel between the tab and the flange to secure the lens to the paper frame.

13. A method for securing an injection molded plastic lens comprising a channel between a key and a flange extending radially outward from an edge of the lens within a frame, comprising:
  inserting the lens into an aperture of the frame, the aperture having a shape substantially corresponding to a shape of at least a portion of the lens; and
  rotating the lens within the aperture to engage a portion of the frame within the channel.

* * * * *